(12) United States Patent
Togashi

(10) Patent No.: US 7,164,184 B2
(45) Date of Patent: Jan. 16, 2007

(54) MULTILAYER CAPACITOR

(75) Inventor: Masaaki Togashi, Nikaho (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/384,329

(22) Filed: Mar. 21, 2006

(65) Prior Publication Data
US 2006/0221545 A1 Oct. 5, 2006

(30) Foreign Application Priority Data
Mar. 31, 2005 (JP) ............................ P2005-101740

(51) Int. Cl.
*H01L 29/00* (2006.01)
*H01G 4/228* (2006.01)
(52) U.S. Cl. ...................... 257/532; 257/535; 257/303; 361/306.3; 361/306.2; 361/306.1; 361/303
(58) Field of Classification Search ................ 257/532, 257/535; 361/306.1, 303, 306.2, 306.3
See application file for complete search history.

(56) References Cited

U.S. PATENT DOCUMENTS 6,191,932 B1 * 2/2001 Kuroda et al. .............. 361/303

2002/0041006 A1 * 4/2002 Ahiko et al. ................ 257/532

FOREIGN PATENT DOCUMENTS

JP   A 2000-208361   7/2000

* cited by examiner

*Primary Examiner*—Long Tran
(74) *Attorney, Agent, or Firm*—Oliff & Berridge, PLC

(57) ABSTRACT

A multilayer capacitor comprises a multilayer body in which a plurality of dielectric layers and a plurality of first to fourth inner electrodes are alternately arranged, and first to fourth terminal electrodes formed on side faces of the multilayer body. The multilayer capacitor has a first capacitor portion including first and second inner electrodes, and a second capacitor portion including third and fourth inner electrodes and exhibiting a capacitance different from that of the first capacitor portion. The first inner electrodes are electrically connected to respective ones of the plurality of first terminal electrodes through lead conductors, whereas the second inner electrodes are electrically connected to respective ones of the plurality of second terminal electrodes through lead conductors. The third and fourth inner electrodes are electrically connected to the third and fourth terminal electrodes through lead conductors, respectively. Any of the first and third terminal electrodes and any of the second and fourth terminal electrodes are arranged alternately on side faces of the multilayer body in a direction circulating along the side faces of the multilayer body.

4 Claims, 6 Drawing Sheets

MULTILAYER CAPACITOR

BACKGROUND OF THE INVENTION

1. Field of the Invention

The present invention relates to a multilayer capacitor.

2. Related Background Art

Known as this kind of multilayer capacitor is one comprising a multilayer body in which a plurality of dielectric layers and a plurality of inner electrodes are alternately laminated, and a plurality of terminal electrodes formed on the multilayer body (see, for example, Patent Document 1). The multilayer capacitor disclosed in Patent Document 1 comprises a plurality of terminal electrodes, and lowers its equivalent series inductance by regulating the width of lead electrodes for connecting the terminal electrodes and inner electrodes to each other. [Patent Document] Japanese Patent Application Laid-Open No. 2000-208361

SUMMARY OF THE INVENTION

As power circuits used for electronic devices have recently been increasing their frequencies, multilayer capacitors employed in the power circuits have further been demanded to lower their equivalent series inductance (ESL). In the multilayer capacitor disclosed in Patent Document 1, however, terminal electrodes are arranged on only two opposing side faces of a rectangular parallelepiped multilayer body, which is not sufficient for lowering the equivalent series inductance.

On the other hand, multilayer capacitors connected to power circuits and the like of electronic devices for eliminating noises are required to exhibit the noise eliminating effect over a wide frequency band. Consequently, for effectively eliminating noises over a wide frequency band, this kind of multilayer capacitor is demanded to have a low impedance over the wide band. However, no consideration has been given in the multilayer capacitor disclosed in Patent Document 1 for lowering the impedance over the wide band. Therefore, the multilayer capacitor disclosed in Patent Document 1 may not lower the impedance over the wide range, thus making it difficult to eliminate noises effectively over the wide frequency band.

For overcoming the problem mentioned above, it is an object of the present invention to provide a multilayer capacitor which exhibits a low impedance over a wide band while reducing the equivalent series inductance.

The inventors conducted diligent studies about a multilayer capacitor which can satisfy both of demands for lowering the impedance over a wide band and reducing equivalent series inductance. As a result, the inventors have found a new fact that providing two capacitor portions with different capacitances can widen the band, while forming a multilayer body with terminal electrodes such that those having different polarities are alternately arranged can reduce the equivalent series inductance.

In view of such results of studies, in one aspect, the present invention provides a multilayer capacitor comprising a multilayer body in which a plurality of dielectric layers and a plurality of inner electrodes are alternately laminated, and a plurality of terminal electrode groups formed on a side face of the multilayer body; wherein the multilayer body comprises a first capacitor portion including a plurality of first and second inner electrodes as a part of the plurality of inner electrodes, and a second capacitor portion including third and fourth inner electrodes as a part of the plurality of inner electrodes; wherein the plurality of terminal electrode groups comprise a first terminal electrode group including a plurality of first terminal electrodes and a third terminal electrode, and a second terminal electrode group including a plurality of second terminal electrodes and a fourth terminal electrode; wherein the plurality of first and second terminal electrodes are electrically insulated from each other, whereas the third and fourth terminal electrodes are electrically insulated from each other; wherein each of the first internal electrodes is electrically connected through a lead conductor to a first terminal electrode selected from among all the first terminal electrodes, and each of the first terminal electrodes is electrically connected to at least one of the first internal electrodes, wherein each of the second internal electrodes is electrically connected through a lead conductor to a second terminal electrode selected from among all the second terminal electrodes and each of the second terminal electrodes is electrically connected to at least one of the second internal electrodes, wherein the third inner electrode is electrically connected to the third terminal electrode through a lead conductor; wherein the fourth inner electrode is electrically connected to the fourth terminal electrode through a lead conductor; wherein one of the first and third terminal electrodes included in the first terminal electrode group and one of the second and fourth terminal electrodes included in the second terminal electrode group are arranged on the side face of the multilayer body so as to alternate with each other in a direction circulating along the side face of the multilayer body; and wherein the first and second capacitor portions have respective capacitances different from each other.

In another aspect, the present invention provides a multilayer capacitor comprising a substantially rectangular parallelepiped multilayer body in which a plurality of dielectric layers and a plurality of inner electrodes are alternately laminated, and a plurality of terminal electrodes formed on a side face of the multilayer body; wherein the plurality of terminal electrodes include four each of first and second terminal electrodes electrically insulated from each other, and third and fourth terminal electrodes electrically insulated from each other; wherein the substantially rectangular parallelepiped multilayer body includes first and second side faces, parallel to a laminating direction of the multilayer body, opposing each other, and third and fourth side faces, parallel to the laminating direction of the multilayer body, opposing each other; wherein two each of the first and second terminal electrodes in the four each of the first and second terminal electrodes are alternately arranged in this order on the first side face in the direction from the fourth side face to the third side face; wherein two each of the first and second terminal electrodes other than the two each of the first and second terminal electrodes arranged on the first side face in the four each of the first and second terminal electrodes are alternately arranged in this order on the second side face in the direction from the fourth side face to the third side face; wherein the third terminal electrode is arranged on the third side face; wherein the fourth terminal electrode is arranged on the fourth side face; wherein the multilayer body comprises a first capacitor portion including a plurality of first and second inner electrodes as a part of the plurality of inner electrodes, and a second capacitor portion including third and fourth inner electrodes as a part of the plurality of inner electrodes; wherein each of the first internal electrodes is electrically connected through a lead conductor to a first terminal electrode selected from among the four first terminal electrodes, and each of the four first terminal electrodes is electrically connected to at least one of the first internal electrodes, wherein each of the second internal electrodes is electrically connected through a lead conductor to a second terminal electrode selected from among the four second terminal electrodes and each of the four second terminal electrodes is electrically connected to at least one of the second internal electrodes, wherein the third inner electrode is electrically connected to the third terminal electrode through a lead conductor; wherein the fourth inner electrode is electrically connected to the fourth terminal electrode through a lead conductor; and wherein the first and second capacitor portions have respective capacitances different from each other.

Each of these multilayer capacitors includes first and second capacitor portions with different capacitances, and thus exhibit two resonance frequencies. This enables the multilayer capacitor to attain a lower impedance over a wide frequency band. When the first and third terminal electrodes are connected to a plus electrode while the second and fourth terminal electrodes are connected to a minus electrode, for example, in the arrangement of terminal electrodes in these multilayer capacitors, the terminal electrodes connected to different polarities are alternately arranged in the direction circulating along side faces of the multilayer body. Therefore, currents directed opposite from each other flow in lead conductors adjacent to each other in the direction circulating along the side faces of the multilayer body. As a result, magnetic fields caused by these currents cancel each other out, whereby the equivalent series inductance is reduced in these multilayer capacitors.

Preferably, the capacitance of the second capacitor portion is smaller than that of the first capacitor portion. This enables the second capacitor portion to realize a lower impedance in a high frequency band.

The present invention can provide a multilayer capacitor which exhibits a low impedance over a wide band while reducing the equivalent series inductance.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

In the following, preferred embodiments of the present invention will be explained with reference to the accompanying drawings. In the explanation, constituents identical to each other or those having functions identical to each other will be referred to with numerals identical to each other without repeating their overlapping descriptions.

First Embodiment

Figure 1:
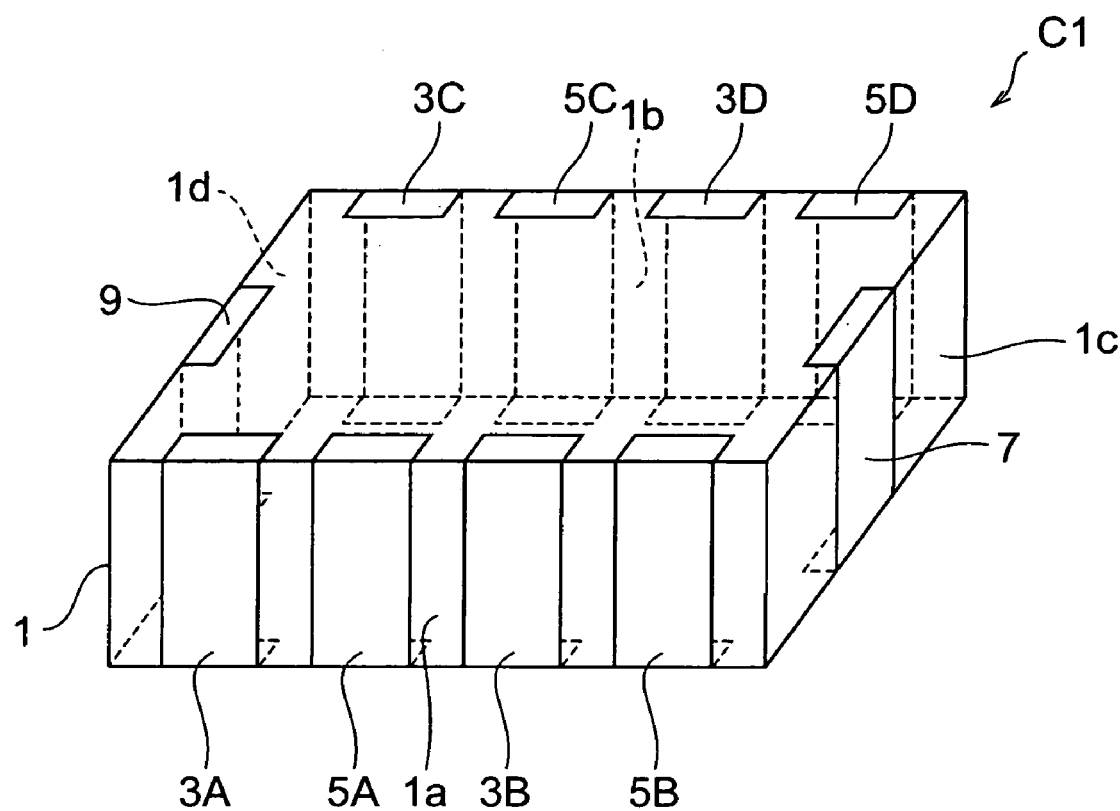
FIG. 1 is a perspective view of the multilayer capacitor in accordance with a first embodiment.
Figure 2:
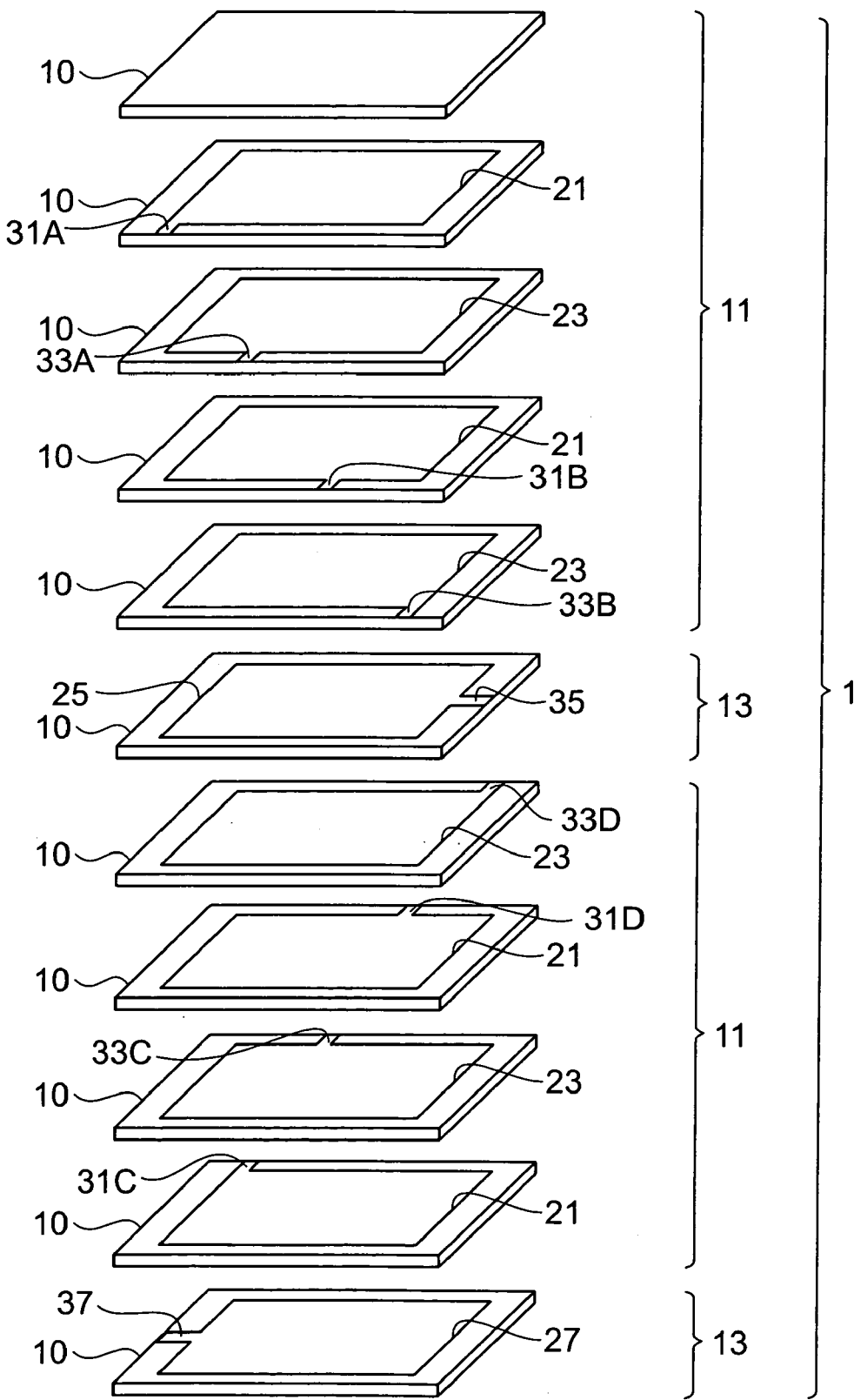
FIG. 2 is an exploded perspective view of the multilayer body included in the multilayer capacitor in accordance with the first embodiment.

With reference to FIGS. 1 and 2, the multilayer capacitor C1 in accordance with a first embodiment will be explained. FIG. 1 is a perspective view of the multilayer capacitor in accordance with the first embodiment. FIG. 2 is an exploded perspective view of the multilayer body included in the multilayer capacitor in accordance with the first embodiment.

As shown in FIG. 1, the multilayer capacitor C1 comprises a substantially rectangular parallelepiped multilayer body 1, and first and second terminal electrode groups formed on the multilayer body 1. The first terminal electrode group includes a plurality of first terminal electrodes 3A to 3D and a third terminal electrode 5. The second terminal electrode group includes a plurality of second terminal electrodes 5A to 5D and a fourth terminal electrode 9.

The first and second terminal electrodes 3A to 3D, 5A to 5D are formed on first and second side faces $1a$, $1b$ of the multilayer body 1, parallel to a laminating direction of the multilayer body 1 which will be explained later, opposing each other. The third and fourth terminal electrodes 7, 9 are respectively formed on third and fourth side faces $1c$, $1d$ of the multilayer body 1, parallel to the laminating direction of the multilayer body 1, opposing each other.

The first terminal electrodes 3A, 3B are formed on the first side face $1a$ of the multilayer body 1. The first terminal electrodes 3C, 3D are formed on the second side face $1b$ of the multilayer body 1 opposing the first side face $1a$. The second terminal electrodes 5A, 5B are formed on the first side face $1a$ of the multilayer body 1. The second terminal electrodes 5C, 5D are formed on the second side face $1b$ of the multilayer body 1 opposing the first side face $1a$.

On the first and second side faces $1a$, $1b$, the first and second terminal electrodes 3A to 3D, 5A to 5D are arranged so as to alternate with each other. Namely, on the first side face $1a$, two each of the first and second terminal electrodes 3A, 3B, 5A, 5B in the four each of the first and second terminal electrodes 3A to 3D, 5A to 5D are arranged in the order of the first and second terminal electrodes in the direction from the fourth side face $1d$ to the third side face $1c$. More specifically, on the first side face $1a$, the first terminal electrode 3A, second terminal electrode 5A, first terminal electrode 3B, and second terminal electrode 5B are arranged in this order in the direction from the fourth side face $1d$ to the third side face $1c$.

On the second side face $1b$, two each of the first and second terminal electrodes 3C, 3D, 5C, 5D other than two each of the first terminal electrodes 3A, 3B, 5A, 5B arranged on the first side face $1a$ in the four each of the first and second terminal electrodes 3A to 3D, 5A to 5D are arranged in the order of the first and second terminal electrodes in the direction from the fourth side face $1d$ to the third side face $1c$. More specifically, on the second side face $1b$, the first terminal electrode 3C, second terminal electrode 5C, first terminal electrode 3D, and second terminal electrode 5D are arranged in this order in the direction from the fourth side face $1d$ to the third side face $1c$.

The first terminal electrodes 3A to 3D and the second terminal electrodes 5A to 5D are electrically insulated from each other.

The third terminal electrode 7 is formed on the third side face 1c of the multilayer body 1. The fourth terminal electrode 9 is formed on the fourth side face 1d of the multilayer body 1 opposing the third side face 1c. The third terminal electrode 7 and fourth terminal electrode 9 are electrically insulated from each other.

Thus, any of the first and third terminal electrodes 3A to 3D, 7 included in the first terminal electrode group and any of the second and fourth terminal electrodes 5A to 5D, 9 included in the second terminal electrode group are alternately arranged on the first to fourth side faces 1a to 1d of the multilayer body 1 in a direction circulating along the side faces (first to fourth side faces 1a to 1d) of the multilayer body 1 parallel to the laminating direction of the multilayer body 1 so as to intersect the laminating direction. Namely, along the periphery of the bottom face of the multilayer body 1 intersecting the laminating direction, any of the first and third terminal electrodes 3A to 3D, 7 included in the first terminal electrode group and any of the second and fourth terminal electrodes 5A to 5D, 9 included in the second terminal electrode group are alternately arranged on the first to fourth side faces 1a to 1d of the multilayer body 1 in a direction circulating along the periphery so as to intersect the laminating direction.

As shown in FIG. 2, the multilayer body 1 comprises a first capacitor portion 11 and a second capacitor portion 13. The multilayer body 1 is formed by the first capacitor portion 11 and second capacitor portion 13 integrated together.

To begin with, the structure of the first capacitor portion 11 will be explained. The first capacitor portion 11 includes a plurality of (9 in this embodiment) dielectric layers 10 and a plurality of (4 each in this embodiment) first and second inner electrodes 21, 23. The first and second inner electrodes 21, 23 are laminated so as to alternate with the dielectric layers 10 in between. In the actual multilayer capacitor C1, the dielectric layers 10 are integrated to such an extent that no boundaries are discernible therebetween.

As shown in FIG. 2, each first inner electrode 21 has a rectangular form. The first inner electrodes 21 are located at positions separated by predetermined gaps from the first to fourth side faces 1a to 1d of the multilayer body 1 parallel to the laminating direction of the first and second inner electrodes 21, 23 (which will simply be referred to as "laminating direction" in the following). Each dielectric layer 10 also has a rectangular form as shown in FIG. 2.

The plurality of first inner electrodes 21 are formed with respective lead conductors 31A to 31D. The lead conductors 31A, 31B extend from the first inner electrodes 21 so as to reach the first side face 1a of the multilayer body 1. The lead conductors 31C, 31D extend from the first inner electrodes 21 so as to reach the second side face 1b of the multilayer body 1.

Each of the first internal electrodes 21 is electrically connected through the lead conductor 31A to 31D to a first terminal electrode selected from among all the four first terminal electrodes 3A to 3D. Each of the four first terminal electrodes 3A to 3D is electrically connected to at least one of the first internal electrodes 21.

Specifically, the first inner electrode 21 formed with the lead conductor 31A is electrically connected to the first terminal electrode 3A through the lead conductor 31A. The first inner electrode 21 formed with the lead conductor 31B is electrically connected to the first terminal electrode 3B through the lead conductor 31B. The first inner electrode 21 formed with the lead conductor 31C is electrically connected to the first terminal electrode 3C through the lead conductor 31C. The first inner electrode 21 formed with the lead conductor 31D is electrically connected to the first terminal electrode 3D through the lead conductor 31D.

As shown in FIG. 2, each second inner electrode 23 has a rectangular form. The second inner electrodes 23 are located at positions separated by predetermined gaps from the first to fourth side faces 1a to 1d of the multilayer body 1 parallel to the laminating direction.

The plurality of second inner electrodes 23 are formed with respective lead conductors 33A to 33D. The lead conductors 33A, 33B extend from the second inner electrodes 23 so as to reach the first side face 1a of the multilayer body 1. The lead conductors 33C, 33D extend from the second inner electrodes 23 so as to reach the second side face 1b of the multilayer body 1.

Each of the second internal electrodes 23 is electrically connected through a lead conductor 33A to 33D to a second terminal electrode selected from among all the four second terminal electrodes 5A to 5D. Each of the second terminal electrodes 5A to 5D is electrically connected to at least one of the four second internal electrodes 23.

Specifically, the second inner electrode 23 formed with the lead conductor 33A is electrically connected to the second terminal electrode 5A through the lead conductor 33A. The second inner electrode 23 formed with the lead conductor 33B is electrically connected to the second terminal electrode 5B through the lead conductor 33B. The second inner electrode 23 formed with the lead conductor 33C is electrically connected to the second terminal electrode 5C through the lead conductor 33C. The second inner electrode 23 formed with the lead conductor 33D is electrically connected to the second terminal electrode 5D through the lead conductor 33D.

The structure of the second capacitor portion 13 will now be explained. The second capacitor portion 13 includes a plurality of (2 in this embodiment) dielectric layers 10, and one each of third and fourth inner electrodes 25, 27 in this embodiment. In the actual multilayer capacitor C1, the dielectric layers 10 are integrated to such an extent that no boundaries are discernible therebetween.

The number of laminations in the third and fourth inner electrodes 25, 27 differs from the number of laminations in the first and second inner electrodes 21, 23. In this embodiment, the number of laminations is 1 each in the third and fourth inner electrodes 25, 27, which is smaller than the number of laminations (4 each) in the first and second inner electrodes 21, 23.

As shown in FIG. 2, the third inner electrode 25 has a rectangular form. The third inner electrode 25 is located at a position separated by predetermined gaps from the first to fourth side faces 1a to 1d of the multilayer body 1 parallel to the laminating direction.

The third inner electrode 25 is formed with one lead conductor 35. The lead conductor 35 extends from the third inner electrode 25 so as to reach the third side face 1c of the multilayer body 1. The third inner electrode 25 is electrically connected to the third terminal electrode 7 through the lead conductor 35.

As shown in FIG. 2, the fourth inner electrode 27 has a rectangular form. The fourth inner electrode 27 is located at a position separated by predetermined gaps from the first to fourth side faces 1a to 1d of the multilayer body 1 parallel to the laminating direction.

The fourth inner electrode 27 is formed with one lead conductor 37. The lead conductor 37 extends from the fourth inner electrode 27 so as to reach the fourth side face 1d of the multilayer body 1. The fourth inner electrode 27 is electrically connected to the fourth terminal electrode 9 through the lead conductor 37.

FIG. 2 shows an example of the multilayer body 1 in which the first or third inner electrode 21, 25 and the second or fourth inner electrode 23, 27 are alternately arranged along the laminating direction. Namely, the third inner electrode 25 is arranged at a position where a first inner electrode 21 should be if the first and second inner electrodes 21, 23 were arranged alternately. The fourth inner electrode 27 is arranged at a position where of a second inner electrode 23 should be if the first and second inner electrodes 21, 23 were arranged alternately.

The first and second inner electrodes 21, 23 included in the first capacitor portion 11 are electrically connected to the first and second terminal electrodes 3A to 3D, 5A to 5D, respectively. On the other hand, the third and fourth inner electrodes 25, 27 included in the second capacitor portion 13 are electrically connected to the third and fourth terminal electrodes 7, 9, respectively. Therefore, the first capacitor portion 11 and second capacitor portion 13 are connected in parallel.

Figure 3:
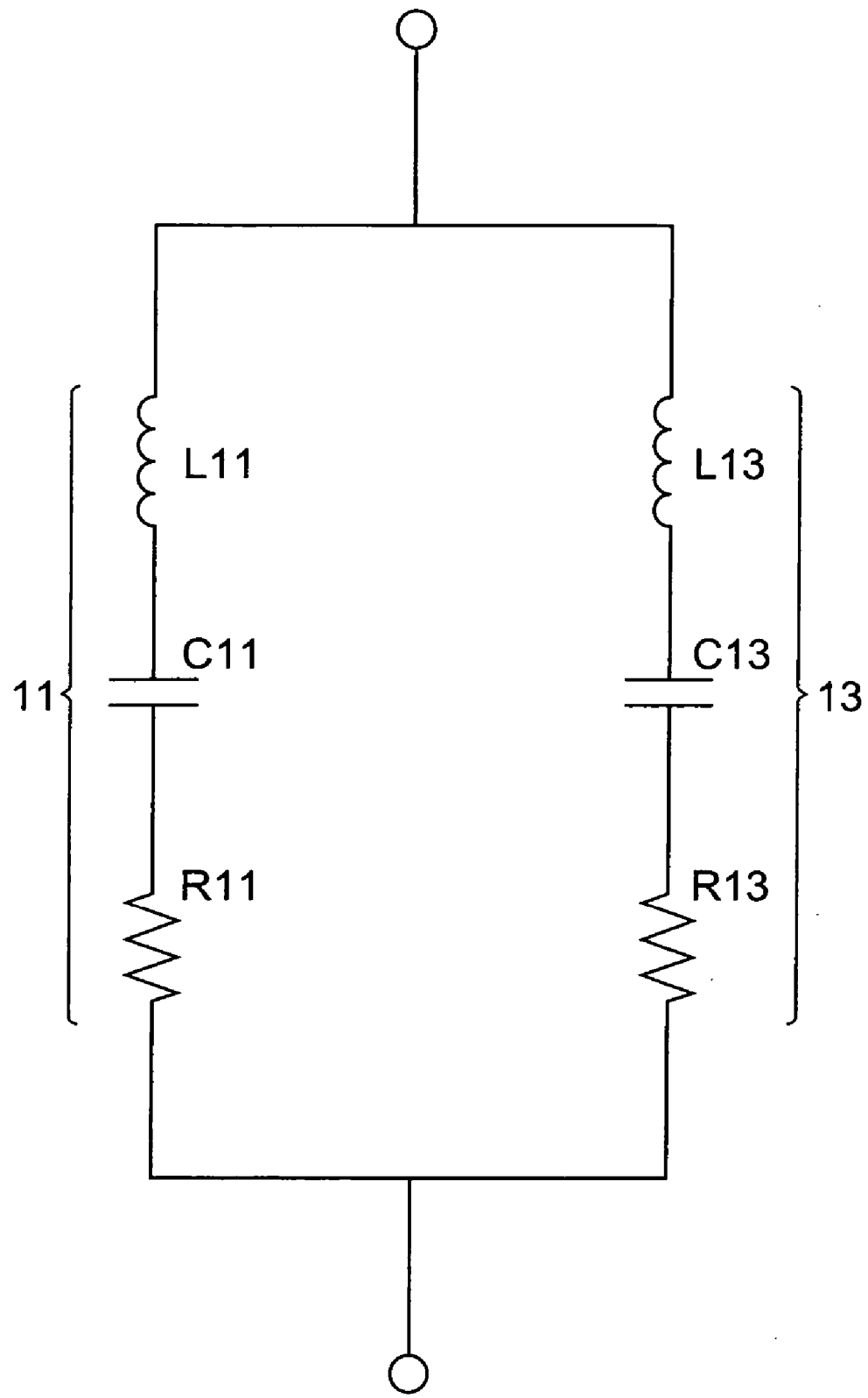
FIG. 3 is an equivalent circuit diagram of the multilayer capacitor in accordance with the first embodiment.

FIG. 3 shows an equivalent circuit diagram of the multilayer capacitor C1. The equivalent circuit diagram of the multilayer capacitor C1 is constituted by a parallel circuit of the first capacitor portion 11 and second capacitor portion 13. In general, residual inductance and residual resistance exist in a capacitor. Therefore, as shown in FIG. 3, not only capacitance C11, but inductance L11 and resistance R11 also exist in the equivalent circuit of the first capacitor portion 11. In the equivalent circuit of the second capacitor portion 13, not only capacitance C13, but inductance L13 and resistance R13 also exist in the equivalent circuit of the first capacitor portion 11.

The first and second capacitor portions 11, 13 have different numbers of laminations of inner electrodes, thus yielding different capacitances. Namely, in the multilayer capacitor C1, the number of laminations of the first and second inner electrodes 21, 23 included in the first capacitor portion 11 is greater than the number of laminations of the third and fourth inner electrodes 25, 27 included in the second capacitor portion 13. Therefore, the capacitance C11 of the first capacitor portion 11 is greater than the capacitance C13 of the first capacitor portion 13.

Assuming that L and C are inductance and capacitance of a capacitor, respectively, the resonance frequency f of the capacitor is represented by expression (1). Expression (1) shows that the resonance frequency f1 of the first capacitor portion 11 and the resonance frequency f2 of the second capacitor portion 13 have respective values different from each other.

$$f = 1/2\pi \cdot sqrt(L \cdot C) \quad (1)$$

When the number of laminations of the third and fourth inner electrodes 25, 27 included in the second capacitor portion 13 is smaller than the number of laminations of the first and second inner electrodes 21, 23 included in the first capacitor portion 11 in particular, the resonance frequency f2 becomes higher than the resonance frequency f1.

Figure 4:
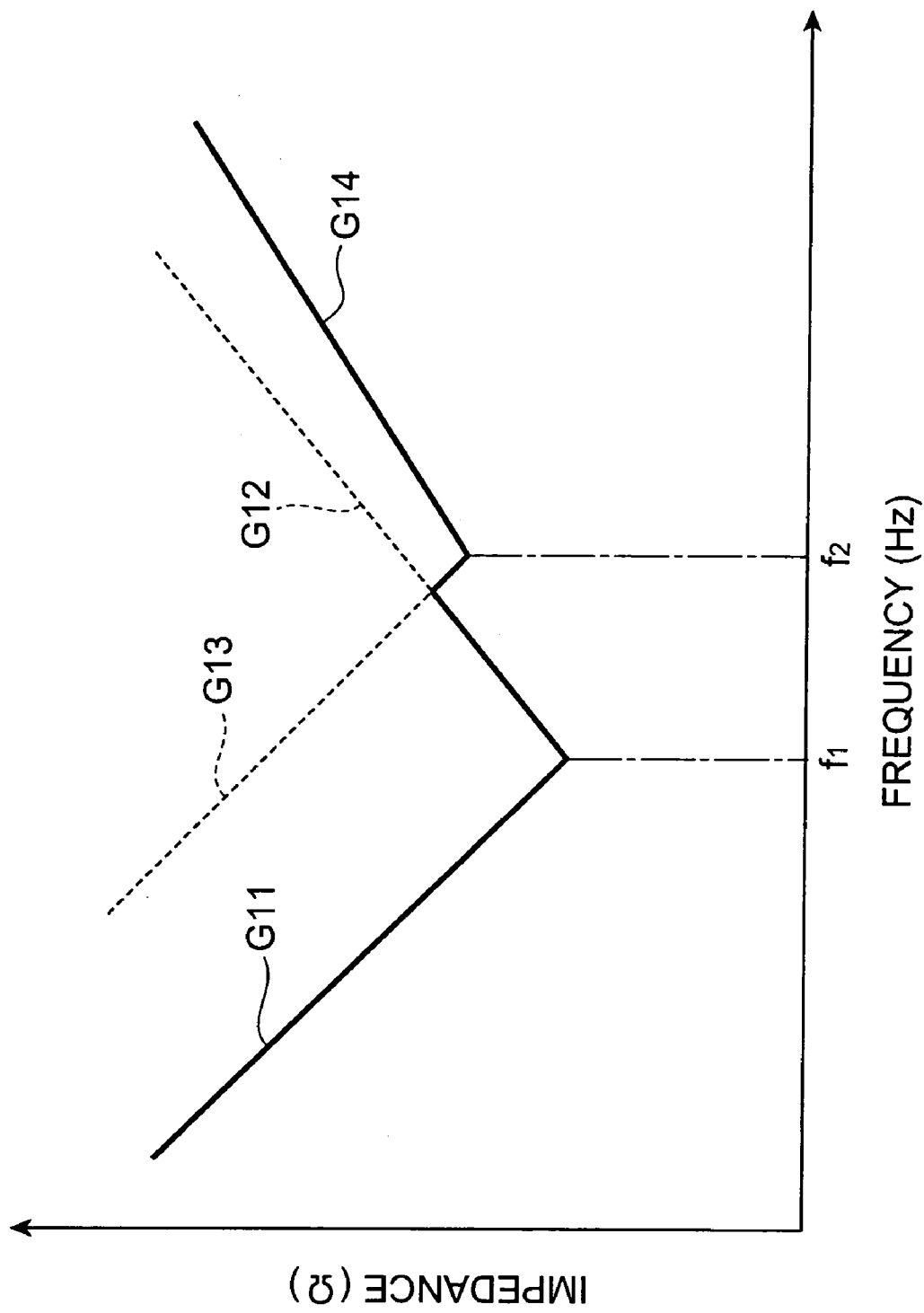
FIG. 4 is a graph showing impedance characteristics vs. frequency of the multilayer capacitor in accordance with the first embodiment.

FIG. 4 is a graph showing impedance characteristics vs. frequency of the multilayer capacitor in accordance with the first embodiment. In the graph shown in FIG. 4, the abscissa and ordinate indicate frequency (Hz) and impedance (Ω), respectively. The impedance characteristic of the first capacitor portion 11 having a large capacitance by itself is represented by lines G11, G12, in which a point where the impedance becomes a local minimum exists only at the resonance frequency f1. The impedance characteristic of the second capacitor portion 12 having a capacitance smaller than that of the first capacitor portion 11 by itself is represented by lines G13, G14, in which a point where the impedance becomes a local minimum exists only at the resonance frequency f2. On the other hand, the impedance characteristic of the multilayer capacitor C1 in which the first and second capacitor portions 11, 13 having different capacitances are connected in parallel is represented by lines G11, G14, in which points where the impedance becomes local minima exist at both of the resonance frequencies f1, f2. The multilayer capacitor C1 has the first and second capacitor portions 11, 13 with different capacitances, and thus can lower the impedance over a wider frequency band than in the case where there is only one capacitance.

In particular, the capacitance C13 of the second capacitor portion 13 is smaller than the capacitance C11 of the first capacitor portion 11. Therefore, the second capacitor portion 13 contributes to lowering the impedance in a high frequency band where the first capacitor portion 11 cannot ameliorate the impedance characteristic by itself. As a result, the multilayer capacitor C1 can lower the impedance in a high frequency band as well.

The first to fourth inner electrodes 21, 23, 25, 27 are connected to the first to fourth terminal electrodes 3A to 3D, 5A to 5D, 7, 9 through the lead conductors 31A to 31D, 33A to 33D, 35, 37. On the first and second side faces 1a, 1b, the first and second terminal electrodes 3A to 3D, 5A to 5D are arranged so as to alternate in the order of the first and second terminal electrodes in the direction from the fourth side face 1d to the third side face 1c. Further, the third terminal electrode 7 and fourth terminal electrode 9 are arranged on the third side face 1c and fourth side face 1d, respectively. Namely, on the first to fourth side faces 1a to 1d of the multilayer body 1, any of the first and third terminal electrodes 3A to 3D, 7 included in the first terminal electrode group of the multilayer body 1 and any of the second and fourth terminal electrodes 5A to 5D, 9 included in the second terminal electrode group of the multilayer body 1 are alternately arranged in a direction circulating along side faces parallel to the laminating direction of the multilayer body 1 so as to intersect the laminating direction. Therefore, when the first terminal electrode group (constituted by the first and third terminal electrodes 3A to 3D, 7) and the second terminal electrode group (constituted by the second and fourth terminal electrodes 5A to 5D, 9) are connected to polarities different from each other, the terminal electrodes connected to respective polarities different from each other are alternately arranged in a direction circulating along the side faces of the multilayer body 1. Consequently, currents directed opposite from each other flow in lead conductors adjacent to each other in the direction circulating along the side faces of the multilayer body 1. As a result, magnetic fields caused by these currents cancel each other out, whereby the equivalent series inductance is reduced in the multilayer capacitor C1.

Thus, the multilayer capacitor C1 can lower the impedance over a wide band while reducing the equivalent series inductance. In this embodiment, the third inner electrode 25 and fourth inner electrode 27 are arranged so as not to neighbor each other in the laminating direction of the multilayer body 1. Namely, at least one of the first and second inner electrodes 21, 23 is positioned between the third inner electrode 25 and fourth inner electrode 27.

Second Embodiment

Figure 5:
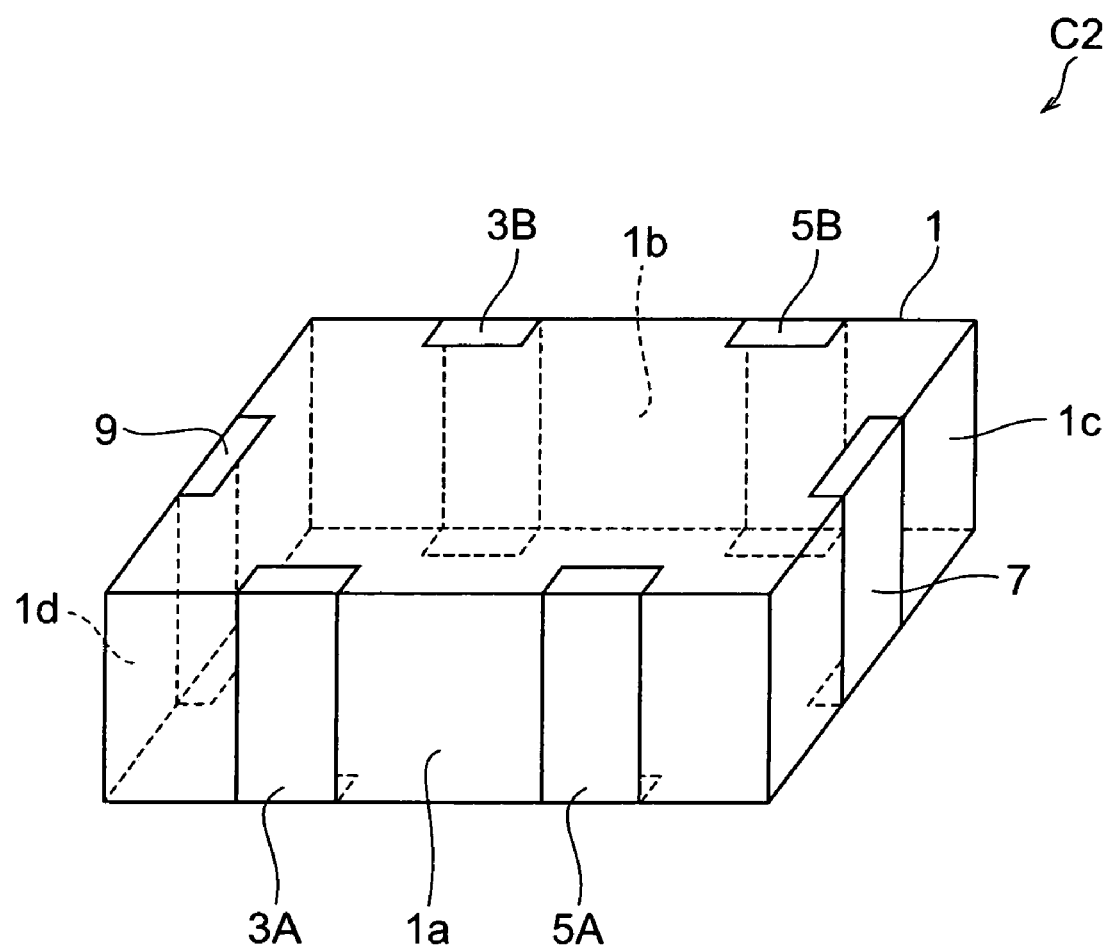
FIG. 5 is a perspective view of the multilayer capacitor in accordance with a second embodiment.
Figure 6:
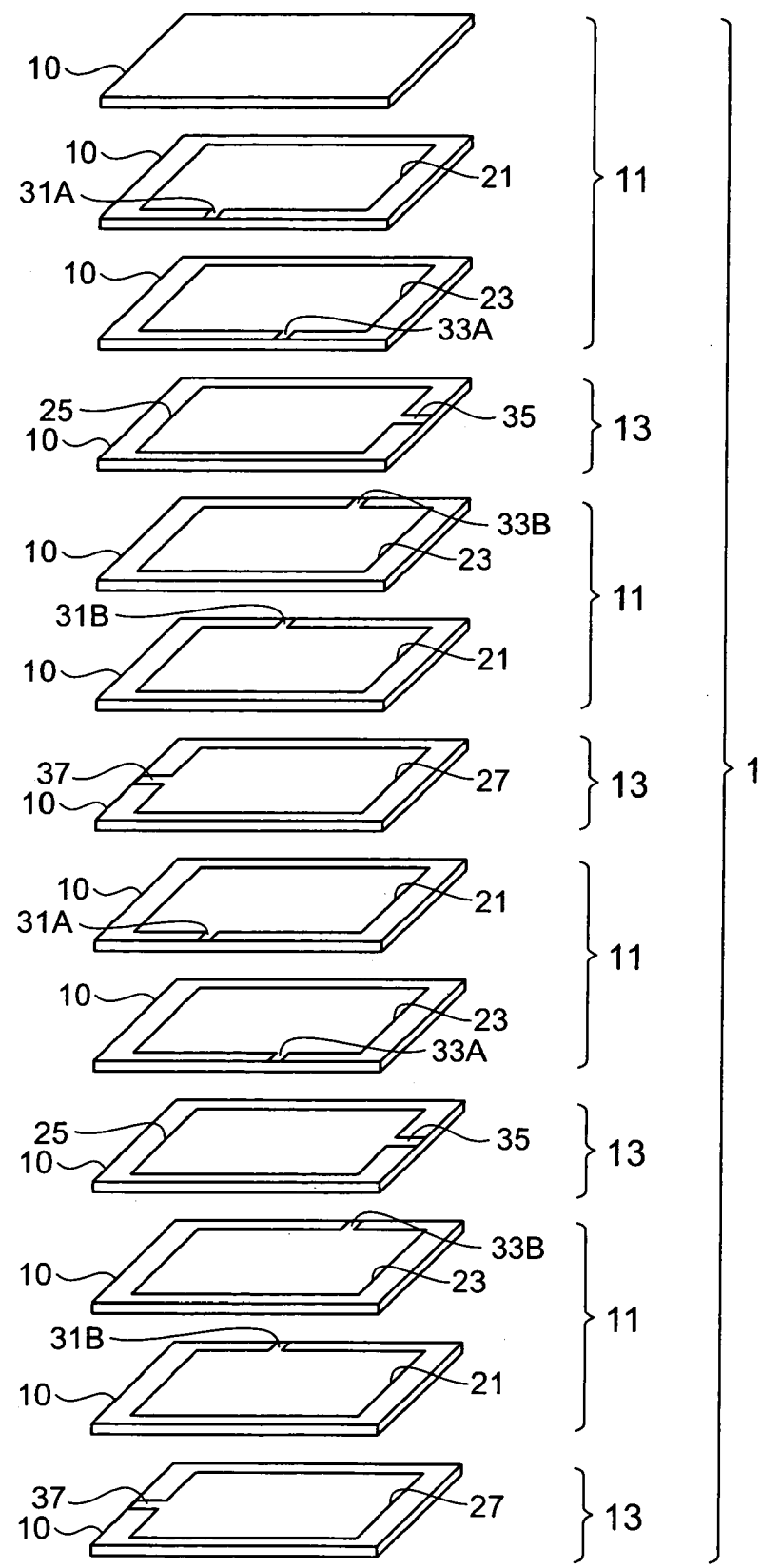
FIG. 6 is an exploded perspective view of the multilayer body included in the multilayer capacitor in accordance with the second embodiment.

With reference to FIGS. 5 and 6, the structure of the multilayer capacitor C2 in accordance with a second embodiment will be explained. The multilayer capacitor C2 in accordance with the second embodiment differs from the multilayer capacitor C1 in accordance with the first embodiment in terms of the number of first and second terminal electrodes. FIG. 5 is a perspective view of the multilayer capacitor in accordance with the second embodiment. FIG. 6 is an exploded perspective view of the multilayer body included in the multilayer capacitor in accordance with the second embodiment.

As shown in FIG. 5, the multilayer capacitor C2 comprises a substantially rectangular parallelepiped multilayer body 1, and first and second terminal electrode groups formed on the multilayer body 1. The first terminal electrode group includes a plurality of first terminal electrodes 3A, 3B and a third terminal electrode 5. The second terminal electrode group includes a plurality of second terminal electrodes 5A, 5B and a fourth terminal electrode 9.

The first and second terminal electrodes 3A, 3B, 5A, 5B are formed on first and second side faces 1a, 1b of the multilayer body 1, parallel to a laminating direction of the multilayer body 1 which will be explained later, opposing each other. The third and fourth terminal electrodes 7, 9 are respectively formed on third and fourth side faces 1c, 1d of the multilayer body 1, parallel to the laminating direction of the multilayer body 1, opposing each other.

The first terminal electrode 3A is formed on the first side face 1a of the multilayer body 1. The first terminal electrode 3B is formed on the second side face 1b of the multilayer body 1 opposing the first side face 1a. The second terminal electrode 5A is formed on the first side face 1a of the multilayer body 1. The second terminal electrode 5B is formed on the second side face 1b of the multilayer body 1 opposing the first side face 1a.

On the first side face 1a, the first and second terminal electrodes 3A, 5A are arranged in this order in the direction from the fourth side face 1d to the third side face 1c. On the second side face 1b, the first and second terminal electrodes 3B, 5B are arranged in this order in the direction from the fourth side face 1d to the third side face 1c. The first terminal electrodes 3A, 3B and the second terminal electrodes 5A, 5B are electrically insulated from each other.

The third terminal electrode 7 is formed on the third side face 1c of the multilayer body 1. The fourth terminal electrode 9 is formed on the fourth side face 1d of the multilayer body 1 opposing the third side face 1c. The third terminal electrode 7 and the fourth terminal electrode 9 are electrically insulated from each other.

Thus, on the first to fourth side faces 1a to 1d of the multilayer body 1, any of the first and third terminal electrodes 3A, 3B, 7 included in the first terminal electrode group and any of the second and fourth terminal electrodes 5A, 5B, 9 included in the second terminal electrode group are alternately arranged on the first to fourth side faces 1a to 1d of the multilayer body 1 in a direction circulating along the side faces (first to fourth side faces 1a to 1d) of the multilayer body 1 parallel to the laminating direction of the multilayer body 1 so as to intersect the laminating direction. Namely, along the periphery of the bottom face of the multilayer body 1 intersecting the laminating direction, any of the first and third terminal electrodes 3A, 3B, 7 included in the first terminal electrode group and any of the second and fourth terminal electrodes 5A, 5B, 9 included in the second terminal electrode group are alternately arranged on the first to fourth side faces 1a to 1d of the multilayer body 1 in a direction circulating along the periphery so as to intersect the laminating direction.

As shown in FIG. 6, the multilayer body 1 comprises a first capacitor portion 11 and a second capacitor portion 13. The multilayer body 1 is formed by the first capacitor portion 11 and second capacitor portion 13 integrated together.

To begin with, the structure of the first capacitor portion 11 will be explained. The first capacitor portion 11 includes a plurality of (9 in this embodiment) dielectric layers 10 and a plurality of (4 each in this embodiment) first and second inner electrodes 21, 23. The first and second inner electrodes 21, 23 are laminated so as to alternate with the dielectric layers 10 in between. In the actual multilayer capacitor C2, the dielectric layers 10 are integrated to such an extent that no boundaries are discernible therebetween.

The plurality of first inner electrodes 21 are formed with respective ones of the lead conductors 31A, 31B. The lead conductors 31A extend from the first inner electrodes 21 so as to reach the first side face 1a of the multilayer body 1. The lead conductors 31B extend from the first inner electrodes 21 so as to reach the second side face 1b of the multilayer body 1.

Each of the first internal electrodes 21 is electrically connected through a lead conductor 31A, 31B to a first terminal electrode selected from among all the first terminal electrodes 3A, 3B. Each of the first terminal electrodes 3A, 3B is electrically connected to at least one of the first internal electrodes 21.

The plurality of second inner electrodes 23 are formed with respective ones of lead conductors 33A, 33B. The lead conductors 33A extend from the second inner electrodes 23 so as to reach the first side face 1a of the multilayer body 1. The lead conductors 33B extend from the second inner electrodes 23 so as to reach the first side face 1b of the multilayer body 1.

Each of the second internal electrodes 23 is electrically connected through a lead conductor 33A, 33B to a second terminal electrode selected from among all the second terminal electrodes 5A, 5B. Each of the second terminal electrodes 5A, 5B is electrically connected to at least one of the second internal electrodes 23.

The structure of the second capacitor portion 13 will now be explained. The second capacitor portion 13 includes a plurality of (4 in this embodiment) dielectric layers 10, and a plurality of (2 each in this embodiment) of third and fourth inner electrodes 25, 27. In the actual multilayer capacitor C2, the dielectric layers 10 are integrated to such an extent that no boundaries are discernible therebetween.

The number of laminations in the third and fourth inner electrodes 25, 27 differs from the number of laminations in the first and second inner electrodes 21, 23. In this embodiment, the number of laminations is 2 each in the third and fourth inner electrodes 25, 27, which is smaller than the number of laminations (4 each) in the first and second inner electrodes 21, 23.

FIG. 6 shows an example of the multilayer body 1 in which the first or third inner electrode 21, 25 and the second or fourth inner electrode 23, 27 are alternately arranged along the laminating direction. Namely, the third inner electrode 25 is arranged at a position where a first inner electrode 21 should be if the first and second inner electrodes 21, 23 were arranged alternately. The fourth inner electrode 27 is arranged at a position where a second inner electrode 23 should be if the first and second inner electrodes 21, 23 were arranged alternately.

In the multilayer capacitor C2, the first capacitor portion 11 and the second capacitor portion 13 are connected in parallel. Since the number of laminations of the first and second inner electrodes 21, 23 differs from the number of laminations of the third and fourth inner electrodes 25, 27, the first and second capacitor portions 11, 13 have respective capacitances different from each other. Therefore, as with the multilayer capacitor C1 in accordance with the first embodiment, the multilayer capacitor C2 in accordance with the second embodiment can lower the impedance over a wide frequency band.

In particular, the number of laminations of the third and fourth inner electrodes 25, 27 is smaller than the number of laminations of the first and second inner electrodes 21, 23 in the multilayer capacitor C2. Therefore, the capacitance C13 of the second capacitor portion 13 is smaller than the capacitance C11 of the first capacitor portion 11. Consequently, the second capacitor portion 13 contributes to lowering the impedance in a high frequency band where the first capacitor portion 11 cannot ameliorate the impedance characteristic by itself. As a result, the multilayer capacitor C2 can lower the impedance in a high frequency band as well.

The first to fourth inner electrodes 21, 23, 25, 27 are connected to the first to fourth terminal electrodes 3A, 3B, 5A, 5B, 7, 9 through the lead conductors 31A, 31B, 33A, 33B, 35, 37. Further, on the first to fourth side faces 1a to 1d of the multilayer body 1, any of the first and third terminal electrodes 3A, 3B, 7 included in the first terminal electrode group and any of the second and fourth terminal electrodes 5A, 5B, 9 included in the second terminal electrode group are alternately arranged in a direction circulating along side faces parallel to the laminating direction of the multilayer body 1 so as to intersect the laminating direction. Therefore, when the first terminal electrode group (constituted by the first and third terminal electrodes 3A, 3B, 7) and the second terminal electrode group (constituted by the second and fourth terminal electrodes 5A, 5B, 9) are connected to polarities different from each other, the terminal electrodes connected to respective polarities different from each other are alternately arranged in a direction circulating along the side faces of the multilayer body 1. Consequently, currents directed opposite from each other flow in lead conductors adjacent to each other in the direction circulating along the side faces of the multilayer body 1. As a result, magnetic fields caused by these currents cancel each other out, whereby the equivalent series inductance is reduced in the multilayer capacitor C2.

Thus, the multilayer capacitor C2 can lower the impedance over a wide band while reducing the equivalent series inductance. In this embodiment, the third inner electrode 25 and fourth inner electrode 27 are arranged so as not to neighbor each other in the laminating direction of the multilayer body 1. Namely, at least one of the first and second inner electrodes 21, 23 is positioned between the third inner electrode 25 and fourth inner electrode 27.

Though preferred embodiments of the present invention are explained in detail in the foregoing, the present invention is not limited to the above-mentioned embodiments. For example, the number of laminations of dielectric layers 10, the numbers of laminations of first and second inner electrodes 21, 23, and the number of laminations of third and fourth inner electrodes 25, 27 are not limited to those stated in the above-mentioned embodiments. The number of terminal electrodes 3A to 3D, 5A to 5D, 7, 9 is not limited to those stated in the above-mentioned embodiments. It will be sufficient if at least two each of the first and second terminal electrodes are provided, and if at least one each of the third and fourth terminal electrodes is provided. The number of first inner electrodes 21 and the number of second inner electrodes 23 included in the first capacitor portion 11 are not required to be the same. The number of third inner electrodes 25 and the number of fourth inner electrodes 27 included in the second capacitor portion 13 are not required to be the same. The form of the multilayer body 1 is not limited to rectangular parallelepipeds.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A multilayer capacitor comprising a multilayer body in which a plurality of dielectric layers and a plurality of inner electrodes are alternately laminated, and a plurality of terminal electrode groups formed on a side face of the multilayer body;

wherein the multilayer body comprises a first capacitor portion including a plurality of first and second inner electrodes as a part of the plurality of inner electrodes, and a second capacitor portion including third and fourth inner electrodes as a part of the plurality of inner electrodes;

wherein the plurality of terminal electrode groups comprise a first terminal electrode group including a plurality of first terminal electrodes and a third terminal electrode, and a second terminal electrode group including a plurality of second terminal electrodes and a fourth terminal electrode;

wherein the plurality of first and second terminal electrodes are electrically insulated from each other, whereas the third and fourth terminal electrodes are electrically insulated from each other;

wherein each of the first internal electrodes is electrically connected through a lead conductor to a first terminal electrode selected from among all the first terminal electrodes, and each of the first terminal electrodes is electrically connected to at least one of the first internal electrodes, wherein each of the second internal electrodes is electrically connected through a lead conductor to a second terminal electrode selected from among all the second terminal electrodes and each of the second terminal electrodes is electrically connected to at least one of the second internal electrodes, wherein the third inner electrode is electrically connected to the third terminal electrode through a lead conductor;

wherein the fourth inner electrode is electrically connected to the fourth terminal electrode through a lead conductor;

wherein one of the first and third terminal electrodes included in the first terminal electrode group and one of the second and fourth terminal electrodes included in the second terminal electrode group are arranged on the side face of the multilayer body so as to alternate with each other in a direction circulating along the side face of the multilayer body; and wherein the first and second capacitor portions have respective capacitances different from each other.

2. A multilayer capacitor comprising a substantially rectangular parallelepiped multilayer body in which a plurality of dielectric layers and a plurality of inner electrodes are alternately laminated, and a plurality of terminal electrodes formed on a side face of the multilayer body;
  wherein the plurality of terminal electrodes include four each of first and second terminal electrodes electrically insulated from each other, and third and fourth terminal electrodes electrically insulated from each other;
  wherein the substantially rectangular parallelepiped multilayer body includes first and second side faces, parallel to a laminating direction of the multilayer body, opposing each other, and third and fourth side faces, parallel to the laminating direction of the multilayer body, opposing each other;
  wherein two each of the first and second terminal electrodes in the four each of the first and second terminal electrodes are alternately arranged in this order on the first side face in the direction from the fourth side face to the third side face;
  wherein two each of the first and second terminal electrodes other than the two each of the first and second terminal electrodes arranged on the first side face in the four each of the first and second terminal electrodes are alternately arranged in this order on the second side face in the direction from the fourth side face to the third side face;
  wherein the third terminal electrode is arranged on the third side face;
  wherein the fourth terminal electrode is arranged on the fourth side face;
  wherein the multilayer body comprises a first capacitor portion including a plurality of first and second inner electrodes as a part of the plurality of inner electrodes, and a second capacitor portion including third and fourth inner electrodes as a part of the plurality of inner electrodes;
  wherein each of the first internal electrodes is electrically connected through a lead conductor to a first terminal electrode selected from among the four first terminal electrodes, and each of the four first terminal electrodes is electrically connected to at least one of the first internal electrodes,
  wherein each of the second internal electrodes is electrically connected through a lead conductor to a second terminal electrode selected from among the four second terminal electrodes and each of the four second terminal electrodes is electrically connected to at least one of the second internal electrodes,
  wherein the third inner electrode is electrically connected to the third terminal electrode through a lead conductor;
  wherein the fourth inner electrode is electrically connected to the fourth terminal electrode through a lead conductor; and
  wherein the first and second capacitor portions have respective capacitances different from each other.

3. A multilayer capacitor according to claim 1, wherein the capacitance of the second capacitor portion is smaller than the capacitance of the first capacitor portion.

4. A multilayer capacitor according to claim 2, wherein the capacitance of the second capacitor portion is smaller than the capacitance of the first capacitor portion.

* * * * *